C. W. H. VON ECKERMANN.
METHOD OF WELDING CHAIN LINKS.
APPLICATION FILED MAR. 17, 1920.

1,357,156.  
Patented Oct. 26, 1920.

Inventor  
C. W. H. von Eckermann  
by James Sheehy & Co.  
attys.

UNITED STATES PATENT OFFICE.

CLAES WALTHER HARRY von ECKERMANN, OF LJUSNE, SWEDEN.

METHOD OF WELDING CHAIN-LINKS.

1,357,156.         Specification of Letters Patent.    Patented Oct. 26, 1920.

Application filed March 17, 1920. Serial No. 366,656.

*To all whom it may concern:*

Be it known that I, CLAES WALTHER HARRY VON ECKERMANN, a citizen of the Kingdom of Sweden, residing at Ljusne, Sweden, have invented new and useful Improvements in Methods of Welding Chain-Links, of which the following is a specification.

In welding chain links according to a known method, the link ends are formed with flat surfaces perpendicular to the plane of the link and forced together lengthwise. According to another known method, the contacting end surfaces of the link ends are oblique to the plane of the link and pressed together during welding.

If the chain links be heated electrically, or preheated in a furnace to red heat and then finally heated electrically, it is impossible to prevent slag from remaining on the contacting surfaces thereby rendering the current transmission more difficult and the welded joint less reliable. To overcome said difficulty, the link ends according to this invention are cut off perpendicularly to the plane of the link and moved apart laterally and then moved lengthwise to slightly overlap one another. In effecting the welding, the link ends are moved together laterally so as to pierce into one another and cause the slag to be removed from the end surfaces of the link. After the electrical welding is completed, a finishing shaping pressure may be applied to the welded joint in a hammer.

Figure 1:
Figure 2:
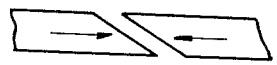
Figure 3:
Figure 4:
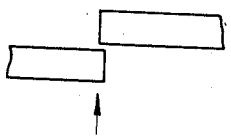
Figure 5:
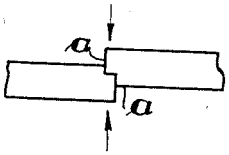

In the accompanying drawing, Figures 1 and 2 illustrate the known methods above referred to, while Figs. 3, 4 and 5 show different steps of the welding method forming the object of this invention.

In Fig. 3 the ends of a chain link are shown after they have been moved apart laterally and further moved lengthwise to slightly overlap one another. In Fig. 4 the link ends are neared to one another and are shown in the relative position they will have at the beginning of the welding operation. Fig. 5 illustrates the penetration of the link ends in one another during the welding operation. The link ends are forced together laterally till they come into alinement. It is well understood, that the slag formed during the welding operation will be effectively removed from the contacting surfaces, in as much as it will be forced out at the angles indicated by $a$ in Fig. 5.

In welding links having larger dimensions it may happen that the electrical heating will not be uniform so that one part of the iron may burn (or oxidize) in the air before another part of the iron is heated to the welding temperature. To overcome said draw-back it is important that the heating takes place as rapidly as possible, that is, by means of current having a great strength. To enable the use of such current, the ends of the ready bent link, after preheating, are dipped into a de-oxidizing substance, before they are inserted between the electrodes. De-oxidizing substances suitable for this purpose are, for instance, charcoal, pit-coal or coke, oxygen-binding chemical compounds, reducing gases or an oxid-protecting substance.

Having now particularly described and ascertained the nature of my said invention and in what manner the same is to be performed, I declare that what I claim is:—

1. In a method of welding chain links, consisting essentially in cutting the ends of the links perpendicularly to the plane of the link moving said ends apart laterally and then moving them lengthwise to a slightly overlapping position with respect to each other, applying a lateral pressure to said overlapped ends whereby they are caused to pierce into one another until the contact surfaces are made to lie substantially perpendicular to the plane of the links, and then applying electric welding heat to said ends simultaneously with said pressure.

2. The method of welding chain links which consists in cutting the said ends perpendicularly to the plane of the link, moving said ends apart laterally and then moving them lengthwise to overlap one another, preheating the links, applying a lateral pressure to the said overlapped ends to cause the same to pierce into one another until the contact surfaces come to lie substantially perpendicular to the plane of the link, and applying electric welding heat to said ends simultaneously with said pressure, and then applying shaping pressure to the welded joint.

3. The method of welding chain links which consists substantially in cutting the said ends perpendicularly to the plane of the link, moving said ends apart laterally and then moving them lengthwise to overlap one another, preheating the link ends, introducing the link into a dioxidizing substance, applying a lateral pressure to said overlapped ends to cause the same to pierce into one another until the contact surfaces come to lie substantially perpendicular to the plane of the link, and applying electric welding heat to said ends simultaneously with said pressure.

In testimony whereof I have signed my name.

CLAES WALTHER HARRY von ECKERMANN.